United States Patent
Chin et al.

(10) Patent No.: US 10,862,997 B2
(45) Date of Patent: Dec. 8, 2020

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Hikotatsu Chin, Tokyo (JP); Ken Miyashita, Tokyo (JP); Katsuya Hyodo, Kanagawa (JP)

(73) Assignee: Sony Corporation, Tokyo (JP)

( * ) Notice: Subject to any disclaimer, the term of this patent is extended or adjusted under 35 U.S.C. 154(b) by 284 days.

(21) Appl. No.: 14/778,029

(22) PCT Filed: Feb. 5, 2014

(86) PCT No.: PCT/JP2014/052663

§ 371 (c)(1),
(2) Date: Sep. 17, 2015

(87) PCT Pub. No.: WO2014/156316

PCT Pub. Date: Oct. 2, 2014

(65) Prior Publication Data

US 2016/0309312 A1 Oct. 20, 2016

(30) Foreign Application Priority Data

Mar. 29, 2013 (JP) .................................. 2013-071911
Oct. 3, 2013 (JP) .................................. 2013-207890

(51) Int. Cl.
*G06F 15/16* (2006.01)
*H04L 29/08* (2006.01)
*H04L 12/24* (2006.01)

(52) U.S. Cl.
CPC .............. *H04L 67/34* (2013.01); *H04L 67/10* (2013.01); *H04L 41/0893* (2013.01)

(58) Field of Classification Search
CPC ............... H04L 29/08072; H04L 29/06; H04L 41/0893; H04L 41/12
(Continued)

(56) References Cited

U.S. PATENT DOCUMENTS 8,094,335 B2 * 1/2012 Eki ........................ H04N 1/56
358/1.15
8,155,786 B2 * 4/2012 Vahlberg .............. G06Q 10/087
700/237
(Continued)

FOREIGN PATENT DOCUMENTS

JP     2006-259839 A    9/2006
JP     2012-243062 A   12/2012
WO    2010/100797 A1    9/2010

*Primary Examiner* — Khanh Q Dinh
(74) *Attorney, Agent, or Firm* — Chip Law Group

(57) ABSTRACT

There is provided an information processing method that effectively executes a plurality of mutually relating functions in a plurality of devices. An information processing device which uses the method includes a functional information acquisition unit configured to acquire, from a first device that executes a first function and a second function that relate to each other, functional information related to the second function; and a function transmission unit that transmits the functional information acquired from the first device to a second device in a manner that the second function among the first function and the second function that have been executed in the first device is executed in the second device.

15 Claims, 19 Drawing Sheets

(58) Field of Classification Search
USPC .................. 709/203, 220, 224, 228, 232
See application file for complete search history.

(56) References Cited

U.S. PATENT DOCUMENTS

| | | | | |
|---|---|---|---|---|
| 8,195,555 | B2* | 6/2012 | Robb | G06Q 40/00 705/36 R |
| 8,231,062 | B1* | 7/2012 | Ayyagari | G06K 19/02 235/487 |
| 8,327,371 | B2* | 12/2012 | Horii | G06F 9/505 718/104 |
| 8,374,944 | B2* | 2/2013 | Robb | G06Q 40/00 705/36 R |
| 8,441,979 | B2* | 5/2013 | Imaeda | H04W 72/005 370/321 |
| 8,659,783 | B2* | 2/2014 | Sasaki | G06K 15/005 358/1.13 |
| 8,717,591 | B2* | 5/2014 | Yagishita | G06F 3/1222 358/1.13 |
| 8,725,417 | B1* | 5/2014 | Young | G08G 5/0052 701/528 |
| 8,930,830 | B2* | 1/2015 | Solaja | G06F 9/542 715/761 |
| 2002/0085240 | A1* | 7/2002 | Saito | H04N 1/00209 358/402 |
| 2004/0081248 | A1* | 4/2004 | Parolari | H04L 1/0003 375/259 |
| 2005/0186920 | A1* | 8/2005 | Staszewski | H03L 7/16 455/114.1 |
| 2005/0237566 | A1* | 10/2005 | Sakuda | H04N 1/00347 358/1.15 |
| 2005/0243362 | A1* | 11/2005 | Sakuda | H04N 1/00278 358/1.15 |
| 2006/0111139 | A1* | 5/2006 | Kitajima | H04M 1/2745 455/550.1 |
| 2007/0242297 | A1* | 10/2007 | Eki | H04N 1/56 358/1.9 |
| 2008/0002579 | A1* | 1/2008 | Lindholm | H04L 47/2441 370/230 |
| 2008/0212699 | A1* | 9/2008 | Imaeda | H04L 41/0893 375/260 |
| 2008/0304107 | A1* | 12/2008 | Yamakawa | G06F 17/211 358/1.18 |
| 2008/0319575 | A1* | 12/2008 | Vahlberg | G06Q 10/087 700/232 |
| 2009/0199198 | A1* | 8/2009 | Horii | G06F 9/505 718/104 |
| 2010/0022310 | A1* | 1/2010 | van Datta | H04N 21/44012 463/43 |
| 2010/0194849 | A1* | 8/2010 | Bruno | H04N 7/142 348/14.16 |
| 2011/0025494 | A1* | 2/2011 | Adcook | G01S 5/0284 340/539.13 |
| 2013/0128804 | A1* | 5/2013 | Imaeda | H04W 72/04 370/315 |
| 2013/0151301 | A1* | 6/2013 | Robb | G06F 9/54 705/7.18 |

* cited by examiner

FIG. 3

| SPECIFICATION OF TRANSMISSION DESTINATION DEVICE | | TV | PC | TABLET | MOBILE | GLASSES-TYPE DEVICE | WRIST WATCH-TYPE DEVICE | ... |
|---|---|---|---|---|---|---|---|---|
| DEVICE ID | | 100 | 101 | 102 | 103 | 104 | 105 | ... |
| INPUT | KEYBOARD | ○ | ○ | × | × | × | × | ... |
| | AUDIO INPUT | × | ○ | ○ | ○ | ○ | × | ... |
| | TOUCH INPUT | × | × | ○ | ○ | △ | ○ | ... |
| | MOUSE INPUT | × | ○ | × | × | × | × | ... |
| OUTPUT | SCREEN DISPLAY | ○ | ○ | ○ | ○ | ○ | ○ | ... |
| | SCREEN RESOLUTION | 1920×1080 | 1600×900 | 1920×1200 | 1280×720 | 480×320 | 128×128 | ... |
| | SCREEN SIZE | 40 INCHES | 13 INCHES | 10 INCHES | 5 INCHES | 2 INCHES | 1.3 INCHES | ... |
| | AUDIO OUTPUT | ○ | ○ | ○ | ○ | ○ | ○ | ... |
| OPTION | DISTANCE FROM USER | 5 m | 2 m | 3 m | 1 m | 0 m | 0 m | ... |

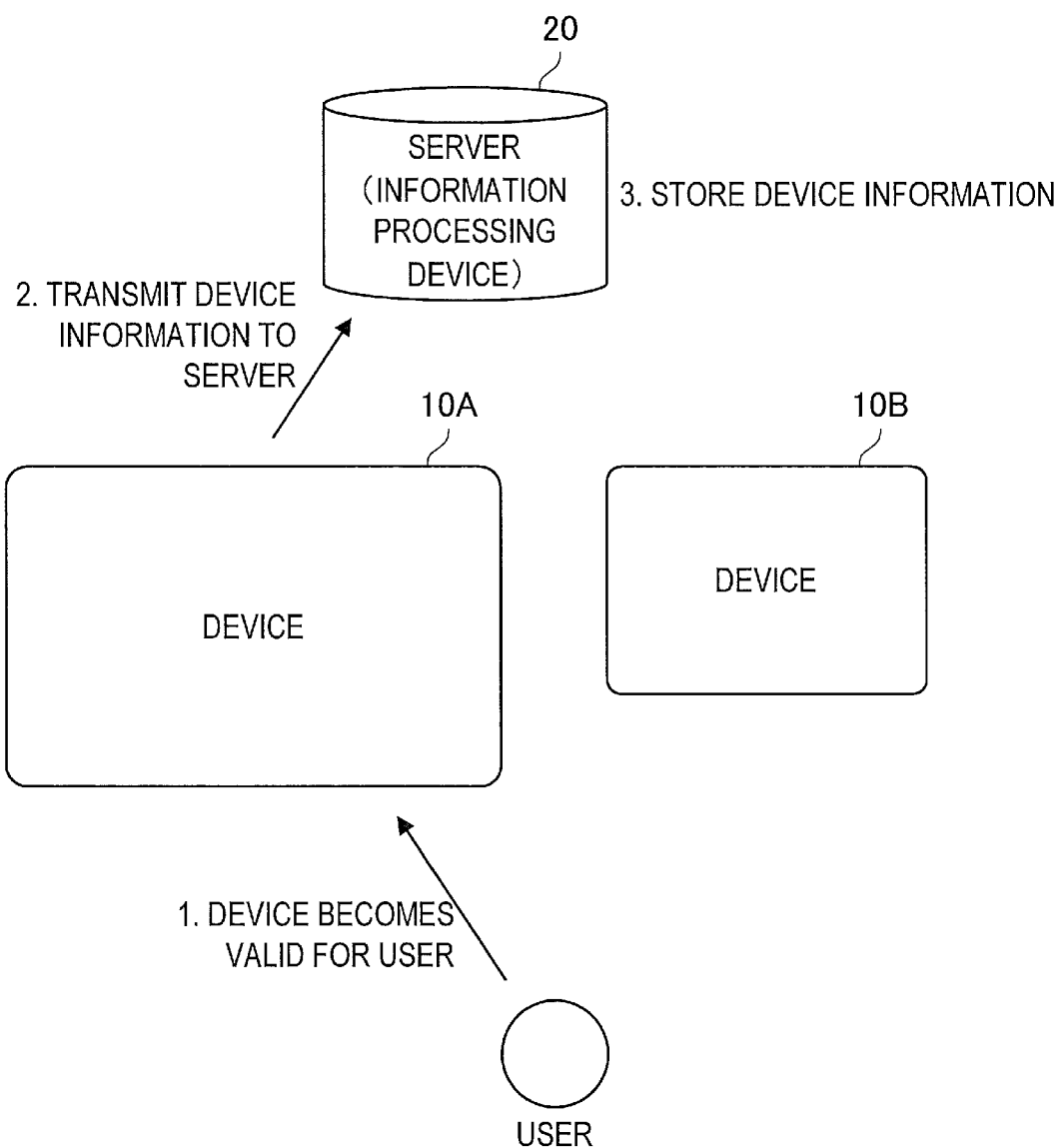

FIG. 5

|  |  | CHARACTER INPUT FUNCTION |
|---|---|---|
| TRANSMISSION SOURCE DEVICE ID | | 100 |
| APPLICATION ID | | 1000 |
| FUNCTION ID | | 2000 |
| INPUT | KEYBOARD | 2 |
| | AUDIO INPUT | 1 |
| | TOUCH INPUT | 3 |
| | MOUSE INPUT | × |
| OUTPUT | SCREEN DISPLAY | ○ IN CASE OF TOUCH INPUT OTHERWISE, × |
| | SCREEN RESOLUTION | ○ IN CASE OF TOUCH INPUT HIGH RESOLUTION HAS HIGH PRIORITY |
| | SCREEN SIZE | NO DESIGNATION |
| | AUDIO OUTPUT | ○ |
| OPTION | DISTANCE FROM USER | SHORT DISTANCE HAS HIGH PRIORITY |

FIG. 10
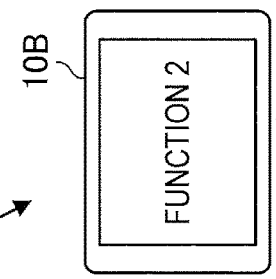
SITUATION 2
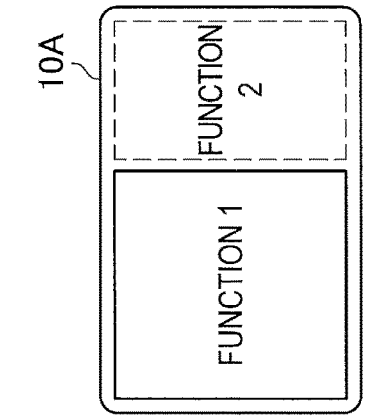
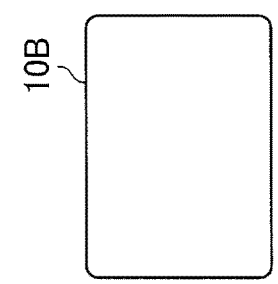
SITUATION 1

INFORMATION PROCESSING DEVICE, INFORMATION PROCESSING METHOD, AND INFORMATION PROCESSING SYSTEM

TECHNICAL FIELD

The present invention relates to an information processing device, an information processing method, and an information processing system.

BACKGROUND ART

In recent years, there have been more and more cases where devices such as mobile phones or TVs having communication functions communicate with each other via a network. Meanwhile, mobile phones, TVs, and the like have higher functions, and various applications can be utilized.

Cited Literature 1 discloses a mechanism in which, in a situation where a receiver and a terminal device can communicate with each other via a network, the devices cooperate with each other to display, on the terminal device, an application of the receiver side.

CITATION LIST

Patent Literature

Patent Literature 1: JP 2012-243062A

SUMMARY OF INVENTION

Technical Problem

The above mechanism can transmit an application between devices, but cannot separate a plurality of functions in one application executed by a first device to transmit them to a second device.

Accordingly, the present disclosure proposes a method of utilizing a plurality of mutually relating functions in a plurality of devices effectively.

Solution to Problem

According to the present disclosure, there is provided an information processing device including: a functional information acquisition unit configured to acquire, from a first device that executes a first function and a second function that relate to each other, functional information related to the second function; and a function transmission unit configured to transmit the functional information acquired from the first device to a second device in a manner that the second function among the first function and the second function that have been executed in the first device is executed in the second device.

According to the present disclosure, there is provided an information processing method including: acquiring, from a first device that executes a first function and a second function that relate to each other, functional information related to the second function; and transmitting the functional information acquired from the first device to the second device in a manner that the second function among the first function and the second function that have been executed in the first device is executed in the second device.

According to the present disclosure, there is provided an information processing system including: a first device; a second device capable of communicating with the first device; and an information processing device including a functional information acquisition unit configured to acquire, from the first device that executes a first function and a second function that relate to each other, functional information related to the second function, and a function transmission unit configured to transmit the functional information acquired from the first device to the second device in a manner that the second function among the first function and the second function that have been executed in the first device is executed in the second device.

Advantageous Effects of Invention

As described above, according to the present disclosure, it becomes possible to utilize a plurality of mutually relating functions in a plurality of devices effectively.

BRIEF DESCRIPTION OF DRAWINGS

FIG. 3 is a table illustrating an example of device information stored in a storage unit 110.

FIG. 4 is a schematic diagram for describing a flow of processing of registering device information.

FIG. 5 is a diagram illustrating an example of functional information a functional information acquisition unit 104 acquires.

FIG. 10 is a schematic diagram for describing a relationship between a direction in which a user's line of sight moves and function transmission.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that the description will be made in the following order
1. First Embodiment
1-1. Outline of Information Processing System
1-2. Configuration of Device
1-3. Configuration of Information Processing Device
1-4. Flow of Transmission of Function between Devices
1-5. Example of Function Transmission Processing between Devices
2. Second Embodiment
3. Third Embodiment
4. Fourth Embodiment
5. Fifth Embodiment
6. Hardware Configuration
7. Conclusion

1. FIRST EMBODIMENT

1-1. Outline of Information Processing System

A configuration of an information processing system according to a first embodiment of the present disclosure will be described with reference to FIG. 1.

Figure 1:
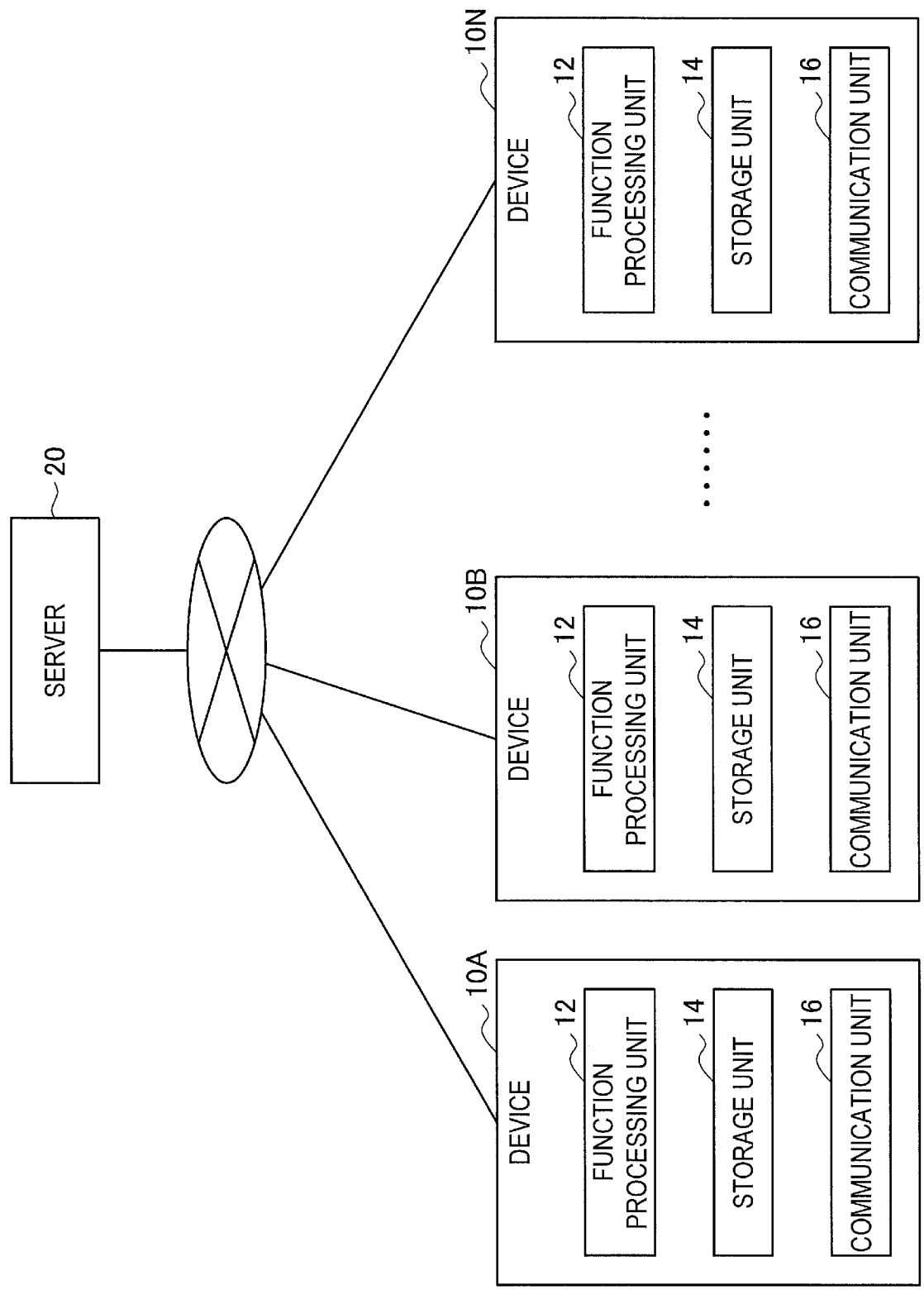
FIG. 1 is a block diagram illustrating an example of a schematic configuration of an information processing system 1 according to a first embodiment of the present disclosure.

FIG. 1 is a block diagram illustrating an example of a schematic configuration of an information processing system 1 according to the first embodiment of the present disclosure. As illustrated in FIG. 1, the information processing system 1 includes a plurality of devices 10A, 10B, ... , 10N (hereinafter also collectively referred to as device 10 or devices 10) and a server 20.

The device 10 is a device having a communication function. For example, the device 10 is a non-portable device such as a TV or a PC, a mobile device such as a mobile phone or a tablet, or a wearable device such as a glasses-type device or a wristwatch-type device. The device 10 can execute a plurality of relating functions. Here, the functions include an input function (keyboard input, audio input) and an output function (display output, audio output).

The server 20 can communicate with the device 10, for example, via a network, and transmits or receives data to or from the device 10. The server 20 is connected to the device 10 with wires or wirelessly. The server 20 according to the first embodiment has a function of an information processing device 100 illustrated in FIG. 2. Thus, the server 20 has a function of transmitting, among functions 1 and 2 being executed by the device 10A (being executed in one application, for example), only the function 2 to the device 10B, and of validating the function 2 in the device 10B. Details will be described later.

1-2. Configuration of Device

Referring to FIG. 1, a functional configuration example of the device 10 according to the first embodiment will be described. As illustrated in FIG. 1, the device 10 includes a function processing unit 12, a storage unit 14, and a communication unit 16.

The function processing unit 12 processes functions such as an input function and an output function. For example, the function processing unit 12 processes a plurality of functions during execution of one application. The function processing unit 12 according to the first embodiment can process a function transmitted from another device 10 via the server 20.

The storage unit 14 stores various programs and data processed by the device 10. For example, the storage unit 14 stores information related to an executable function. The storage unit 14 according to the first embodiment stores information related to the function transmitted from the other device 10. Note that, when the function is transmitted to another device 10, the storage unit 14 deletes the information related to this function.

The communication unit 16 transmits and receives data to and from the server 20 via the network. For example, the communication unit 16 transmits, to the server 20, functional information related to a transmission function to be transmitted to another device 10 and information for validating the transmission function in the other device 10. In addition, the communication unit 16 receives, from the server 20, functional information related to the transmission function transmitted from the other device 10, for example.

1-3. Configuration of Information Processing Device

A functional configuration example of the information processing device 100 according to the first embodiment will be described with reference to FIG. 2. As described above, in the first embodiment, the server 20 serves as the information processing device 100.

Figure 2:
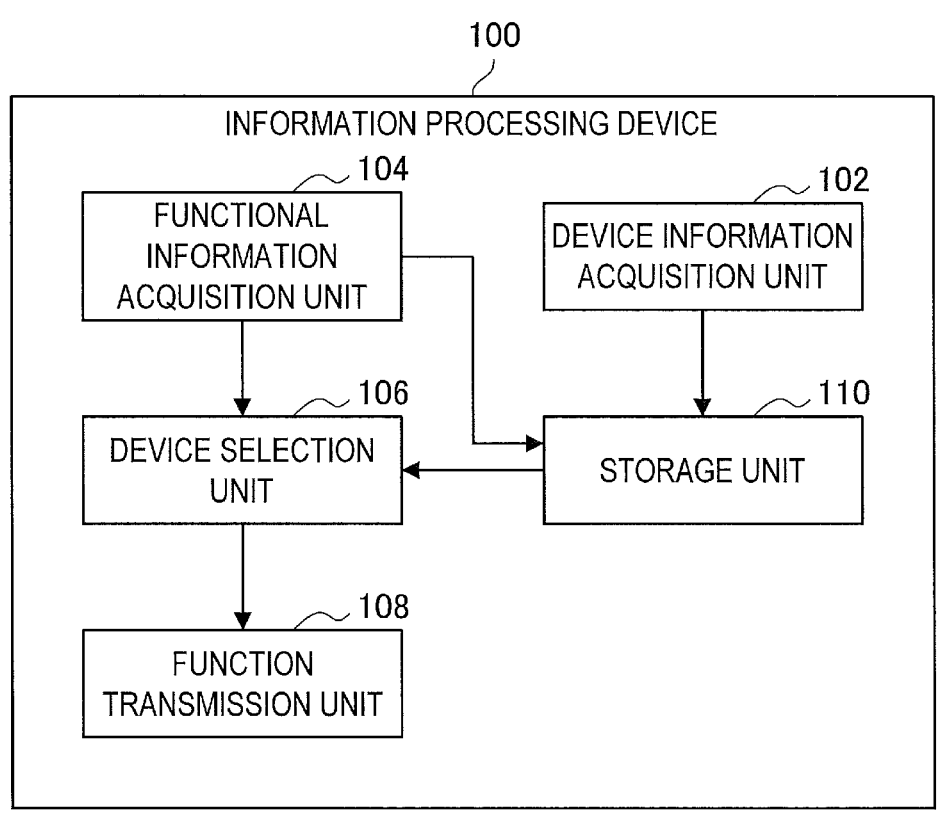
FIG. 2 is a block diagram illustrating an example of a functional configuration of an information processing device 100 according to the first embodiment.

FIG. 2 is a block diagram illustrating an example of a functional configuration of the information processing device 100 according to the first embodiment. As illustrated in FIG. 2, the information processing device 100 includes a device information acquisition unit 102, a functional information acquisition unit 104, a device selection unit 106, a function transmission unit 108, and a storage unit 110.

Device Information Acquisition Unit 102

The device information acquisition unit 102 acquires device information individually from the plurality of devices 10 (the devices 10A to 10N illustrated in FIG. 1). The device information acquisition unit 102 stores the acquired device information in the storage unit 110. Thus, the device information of each device 10 is registered to the information processing device 100.

FIG. 3 is a table illustrating an example of device information stored in the storage unit 110. As illustrated in FIG. 3, the device information includes information related to a device ID, a plurality of input schemes, and a plurality of output schemes. Note that the device information includes option information indicating the distance between a user and a corresponding device 10. The distance can be measured by, for example, but not limited to, a camera mounted on the device 10. Alternatively, it is possible to employ a technique to measure the distance between devices 10 via a network, for example.

Next, a flow of processing of registering the device information will be described with reference to FIG. 4. FIG. 4 is a schematic diagram for describing the flow of processing of registering the device information. Here, an example is shown in which device information of the device 10A is registered.

As illustrated in FIG. 4, while the device 10A is valid for a user (for example, while a user operation is acceptable), the device 10A transmits information of the device 10A to the server 20 (the information processing device 100). The device 10A transmits the device information at every predetermined time, for example. Thus, the device information acquisition unit 102 receives the device information of the device 10A and stores it in the storage unit 110. Note that the same registering processing is performed for other devices including the device 10B.

Functional Information Acquisition Unit 104

The functional information acquisition unit 104 acquires functional information related to a function executed in a first device (in the following description, the device 10A is taken as an example) from the device 10A. The functional information acquisition unit 104 updates the functional information every time the functional information is received from the device 10A.

FIG. 5 is a diagram illustrating an example of the functional information the functional information acquisition unit 104 acquires. As illustrated in the table of FIG. 5, the functional information includes a device ID of a transmission source, an application ID being executed in the transmission source, a function ID, and information related to an input and an output. Although FIG. 5 shows a character inputting function as an example, other functions (such as a video displaying function and a video controlling function) also include the same functional information.

The functional information acquisition unit 104 outputs the acquired functional information to the storage unit 110. In order to manage the functional information of each device 10 in a unitary manner, the storage unit 110 divides and manages the table of functional information in FIG. 5.

Figure 6:
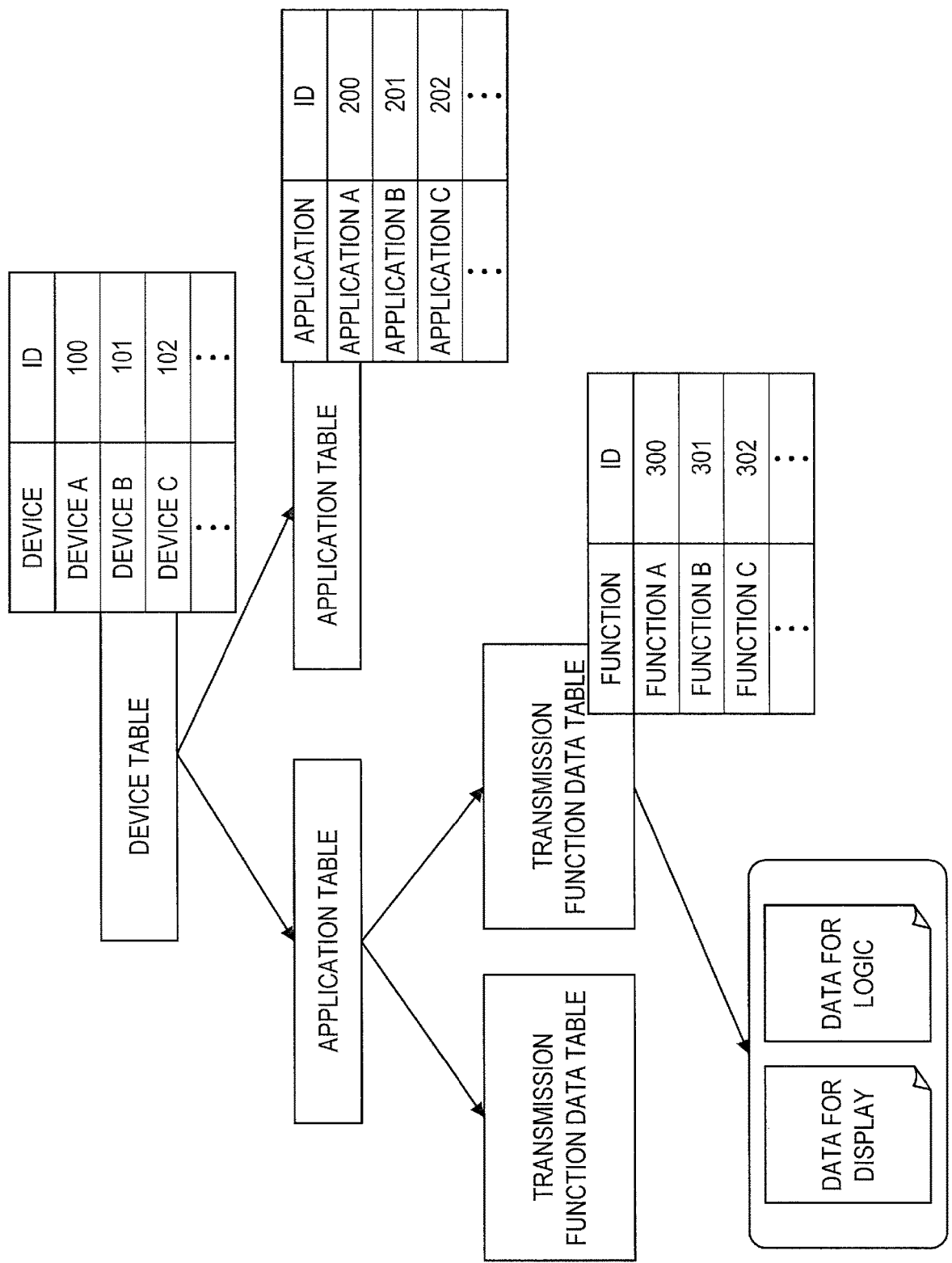
FIG. 6 is a schematic diagram for describing a method of managing functional information of each device 10.

FIG. 6 is a schematic diagram for describing a method of managing the functional information of each device 10. Specifically, as illustrated in FIG. 6, device IDs, application IDs, function IDs in the functional information are individually collected and shown as tables.

The functional information acquisition unit 104 receives information (function validating information) for validating a function in a device being the destination of transmission (in the following description, the device 10B is taken as an example). For example, if a Web application is being executed in the device 10A, the function validating information to be transmitted is file data of HTML and CSS that are necessary to display the function, and the logic of the function is file data of a source code such as JavaScript. The function validating information is also stored in the storage unit 110.

Device Selection Unit 106

The device selection unit 106 selects a device that transmits the functional information of the transmission function from among the plurality of devices 10 (devices 10A, 10B, ..., 10N) capable of communication. The device selection unit 106 selects a device 10 that transmits the function on the basis of the device information and functional information stored in the storage unit 110. This makes it possible to select the device 10 that can appropriately execute the transmission function.

Note that the method of selecting a device is, for example, a method of deciding the order of priority of the function transmission to the plurality of devices 10 as a plurality of candidates for transmission destinations. Thus, the device selection unit 106 selects a device 10 with the highest order of priority and outputs the selected device 10 to the function transmission unit 108. When a function is not transmitted to the selected device 10, the device selection unit 106 selects a device 10 with the second highest order of priority.

Function Transmission Unit 108

The function transmission unit 108 transmits the functional information related to the transmission function to the transmission destination device so that the transmission function can be executed in the transmission destination device (the device selected by the device selection unit 106). Specifically, in order that a transmission source device executes a first function and the transmission destination device executes a second function, the function transmission unit 108 transmits the function information acquired from the transmission source device to the transmission destination device. Thus, the transmission destination device can execute the second function.

Note that, when the function transmission unit 108 transmits the function to the transmission destination device, the storage unit 110 stores the transmitted function in association with the transmission destination device. Thus, it becomes easy to manage the transmission destination of the function, and to perform subsequent processing smoothly.

Further, the function transmission unit 108 transits, to the device 10A, the functional information related to the transmission function that has been transmitted to the transmission destination device so that the transmission function executed in the transmission destination device (the device 10B) can be executed in the transmission source device (the device 10A) again. Thus, the transmission function becomes valid again in the transmission source device.

1-4. Flow of Transmission of Function Between Devices 10

A specific flow of function transmission between devices 10 will be described with reference to FIG. 7.

Figure 7:
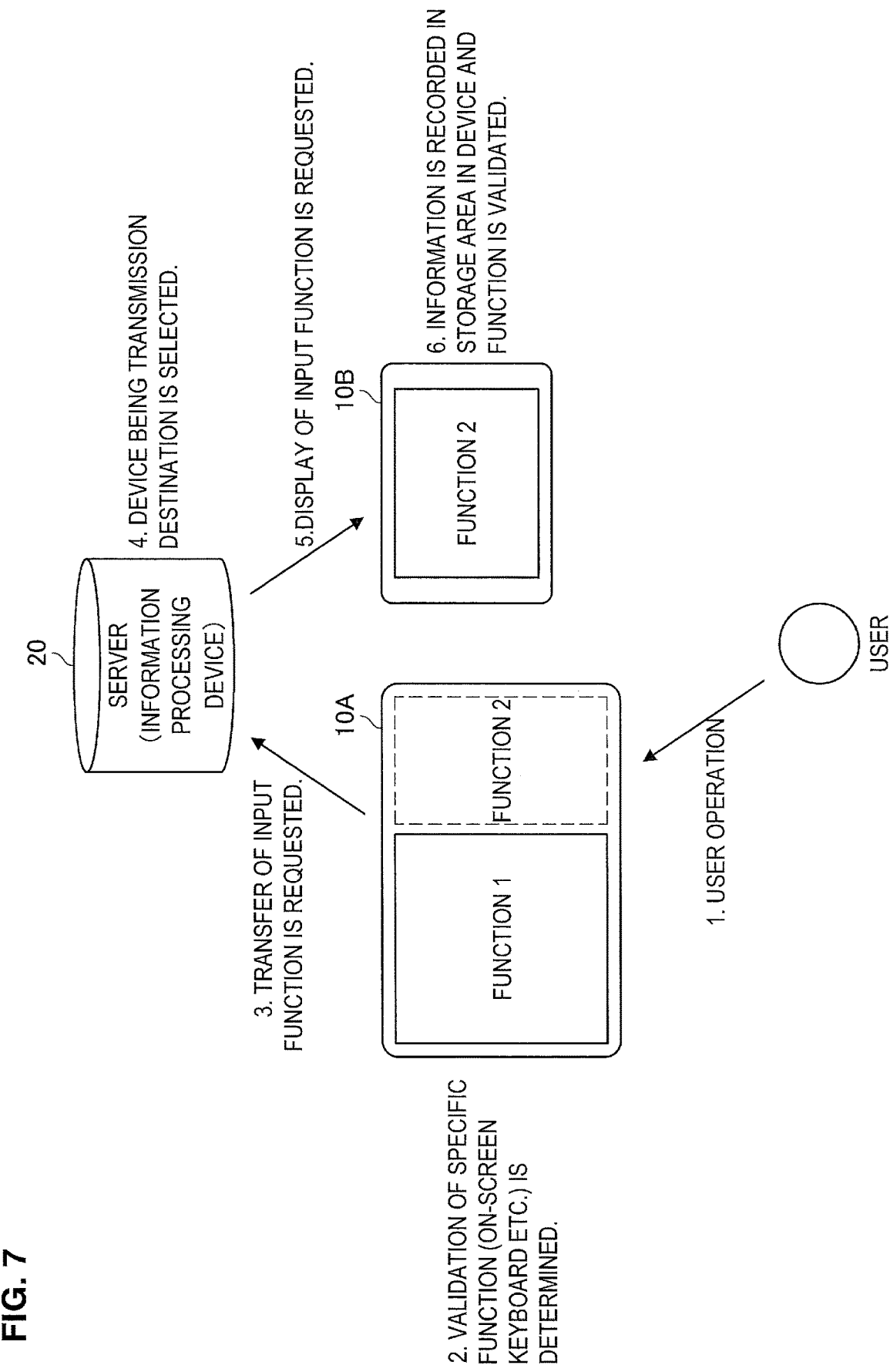
FIG. 7 is a schematic diagram for describing a flow of function transmission between devices.

FIG. 7 is a schematic diagram for describing a flow of function transmission between devices. The situation here is such that a user inputs a character in a text box (a function 2) while viewing a Web page on the device 10A being a TV (a function 1), for example.

In such a situation, when the user performs a user operation for transmitting the function 2 to another device (for example, a mobile terminal such as a tablet or a mobile phone at hands of the user), the device 10A determines validation of the function 2, and transmits information related to the function 2 to the information processing device 100. Thus, the function 2 is invalidated in the device 10A. After that, the information processing device 100 selects the device 10B being the most suitable transmission destination that can execute the function 2.

Then, the information processing device 100 requests the selected device 10B to display the function 2. The device 10B receives the request, and then stores the functional information related to the function 2 in the storage unit and validates display of the function 2. When the user inputs a character with a keyboard in the device 10B where the function 2 is validated, the character input is reflected on the textbox of the Web page on the device 10A in real time.

The character is input with the keyboard of the device 10B in the following description, but there is no limitation thereto. The function of inputting characters may be changed in accordance with the ability of the device 10B. For example, if the device 10B is capable of audio input, the audio input may be validated in response to the function 2.

In the example illustrated in FIG. 7, the function 2 is transmitted from the device 10A to the device 10B; however, when there is no device to which the function 2 is to be transmitted (or when there is no device with a higher priority of execution of the function 2 than the device 10A), the information processing device 100 causes the original device, the device 10A, to execute the function again.

Figure 8:
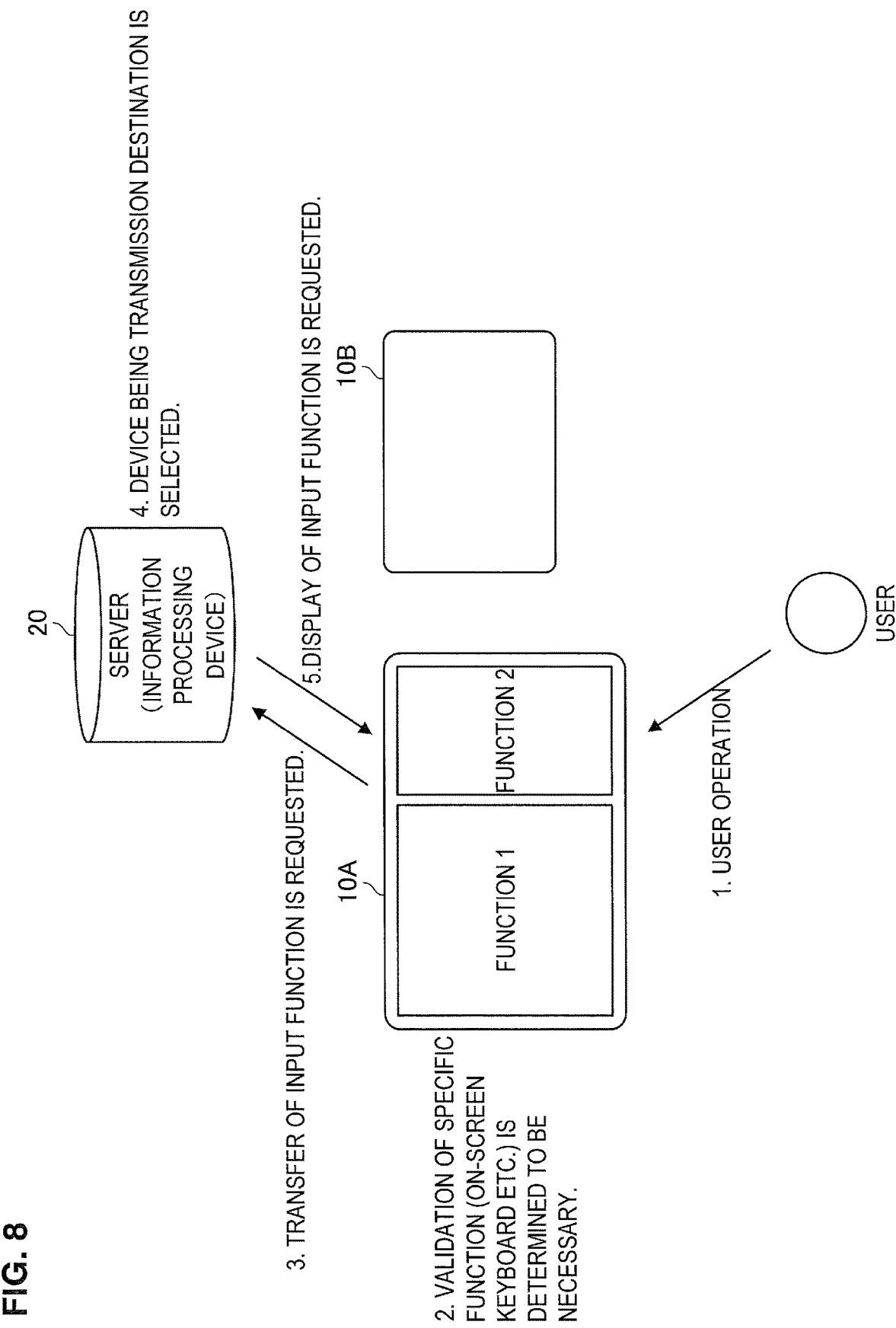
FIG. 8 is a schematic diagram for describing a flow of function transmission between devices.

FIG. 8 is a schematic diagram for describing a flow of function transmission between the devices 10. In FIG. 8, a case is shown in which the user performs an operation with the intention of transmitting the function 2 of the device 10A to another device, but the information processing device 100 determines that there is no device to which the function is to be transmitted. In this case, the information processing device 100 requests the original device 10A to display the function 2. Then, the device 10A causes the function 2 to be valid continuously.

Figure 9:
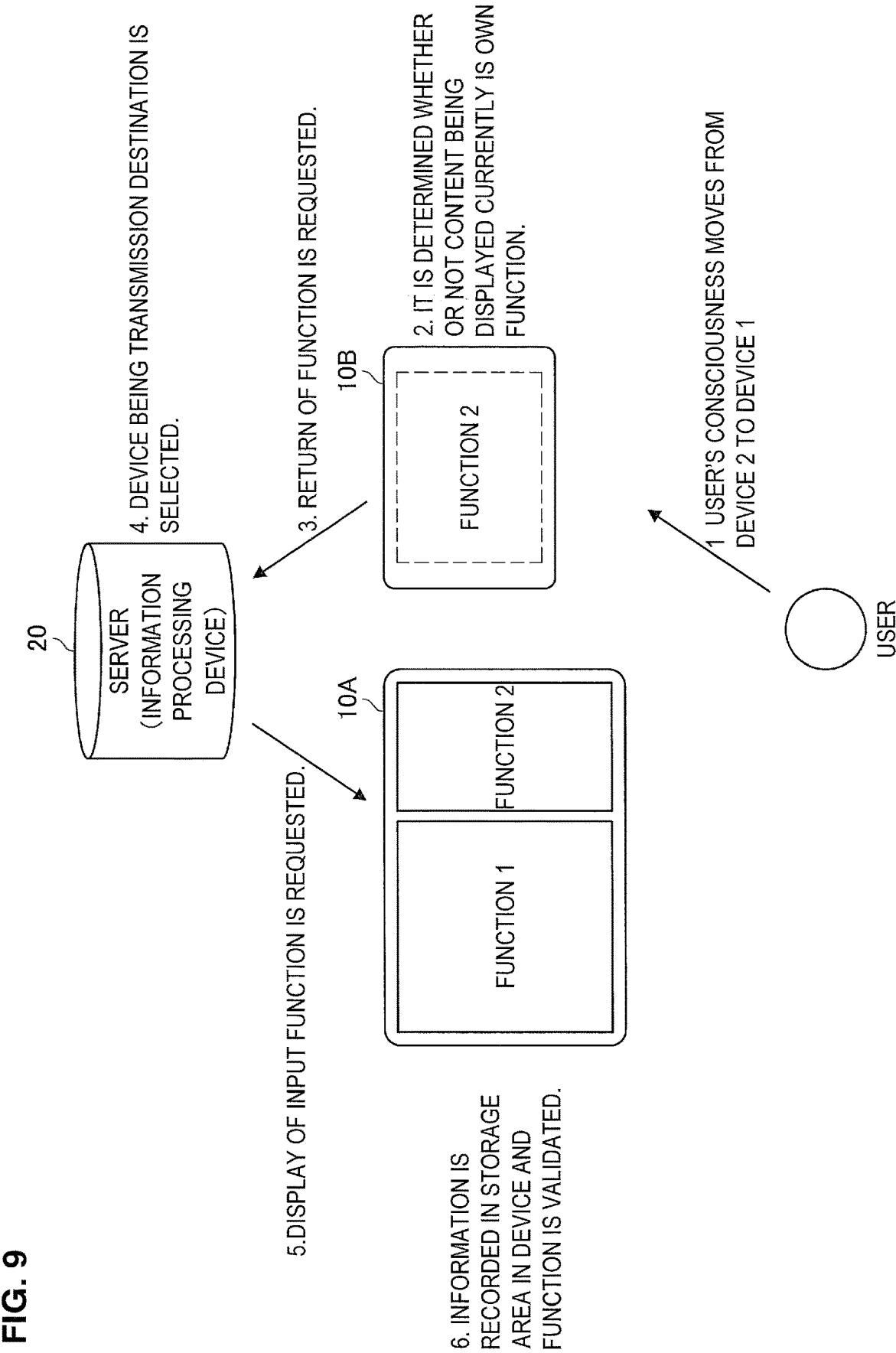
FIG. 9 is a schematic diagram for describing a flow of function transmission between devices.

In this embodiment, when the user performs an operation for returning the function 2 being executed in the device 10B to the device 10A, as illustrated in FIG. 9, the information processing device 100 transmits the function 2 to the device 10A, in an opposite manner of the flow of FIG. 7, and validates the function 2. FIG. 9 is a schematic diagram for describing a flow of function transmission between the devices 10.

Note that, in the description above, the device selection unit 106 selects the device 10B to which the function is transmitted by the user performing the predetermined operation to the device 10A, but there is no limitation to this. For example, the device selection unit 106 may select a device to which the function is transmitted in accordance with the direction in which the user's line of sight moves.

Here, the relationship between the direction in which the user's line of sight moves and the function transmission will be described with reference to FIG. 10. FIG. 10 is a schematic diagram for describing the relationship between the direction in which the user's line of sight moves and the function transmission. In FIG. 10, a case (a situation 1) is shown in which the user inputs a character (the function 2) while viewing a TV on the device 10A (the function 1). In this case, the user's line of sight is toward the device so as to input a character in the device 10A. After that, when the user moves the line of sight to the device 10B (a situation 2), the function 2 of the device 10A is transmitted to the device 10B and validated. Thus, the user can input a character in the device 10B.

Here, a method of validating a function in the transmission destination device will be described with reference to FIG. 11.

Figure 11:
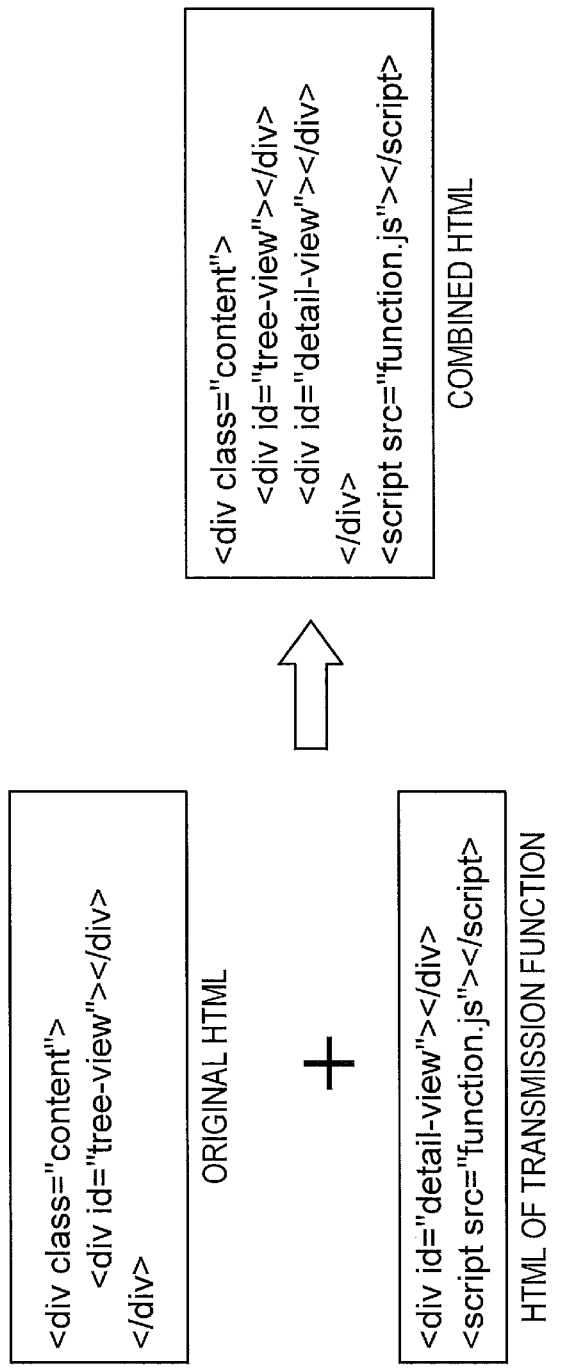
FIG. 11 is a diagram for describing a method of validating a function in the device 10 being a transmission destination.

FIG. 11 is a diagram for describing the method of validating a function in the device 10 being the transmission destination. Here, a function in a Web application being executed (for example, an input function) in the device 10A is transmitted to the device 10B. The device 10B validates the function by combining the original HTML related to the Web application that is included in advance and the HTML of the transmission function received from the information processing device 100, as illustrated in FIG. 11.

1-5. Example of Function Transmission Processing Between Devices

Function transmission processing between devices according to the first embodiment will be described with reference to FIG. 12. The function transmission processing illustrated in FIG. 12 is achieved by the device 10 and a CPU of the information processing device 100 executing a program stored in a ROM.

Note that the program to be executed may be stored in a recording medium such as a CD (compact disk), a DVD (digital versatile disk), or a memory card, or may be downloaded from a server, for example, on the Internet.

Figure 12:
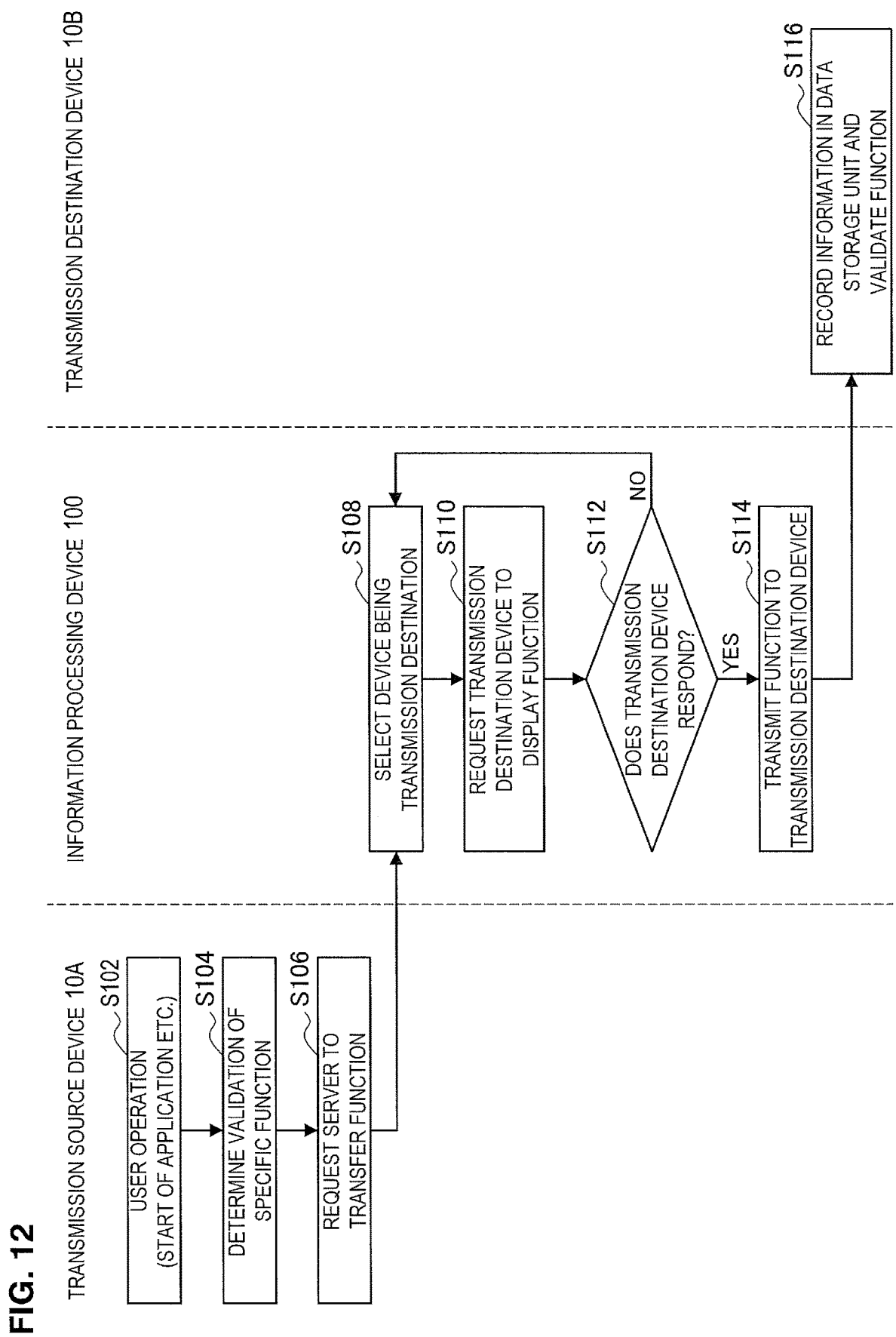
FIG. 12 is a flowchart illustrating function transmission processing between devices according to the first embodiment.

FIG. 12 is a flowchart illustrating the function transmission processing between devices according to the first embodiment. The flowchart in FIG. 12 starts when the user performs an operation (for example, an operation of starting an application) to a device (the device 10A here) being the transmission source of a function (step S102).

Next, the device 10A determines validation of a specific function in the started application (step S104). That is, the device 10A determines a necessary function at that time. Here, in the started application, the functions 1 and 2 are valid.

Next, the device 10A transmits, to the information processing device 100, functional information related to the function that the user desires to transfer (step S106). The functional information includes an ID for identifying the device 10A being the transmission source, and information for validating the function in the device being the transmission destination.

Next, the information processing device 100 selects the most suitable transmission destination device on the basis of the received functional information and the device information stored in the storage unit 110 (step S108). Then, the information processing device 100 requests the selected device to receive the function to be transmitted (step S110).

When the selected device responds the request for reception (step S112: Yes), the information processing device 100 transmits the function to the selected transmission destination device (here, the device 10B) (step S114). On the other hand, when the selected device does not respond the request for reception (step S112: No), the information processing device 100 selects another device (step S108). That is, selection of the transmission destination device is continued until a response to the request for reception is obtained.

The transmission destination device 10B stores the received functional information and validates the function (step S116). Note that the user operation to the function validated in the device 10B is transmitted to the device 10A via the information processing device 100. For example, when the user performs an input operation in the device 10B, the input information is transmitted to the device 10A. Thus, the user can use a plurality of related functions by using two devices.

2. SECOND EMBODIMENT

Next, function transmission of the device 10 according to a second embodiment will be described. In the second embodiment, the device selection unit 106 selects a device being the transmission destination of a function in accordance with the user's position when the user of the function transmission source device moves. Thus, the function is transmitted to a device located around the user during moving.

Figure 13:
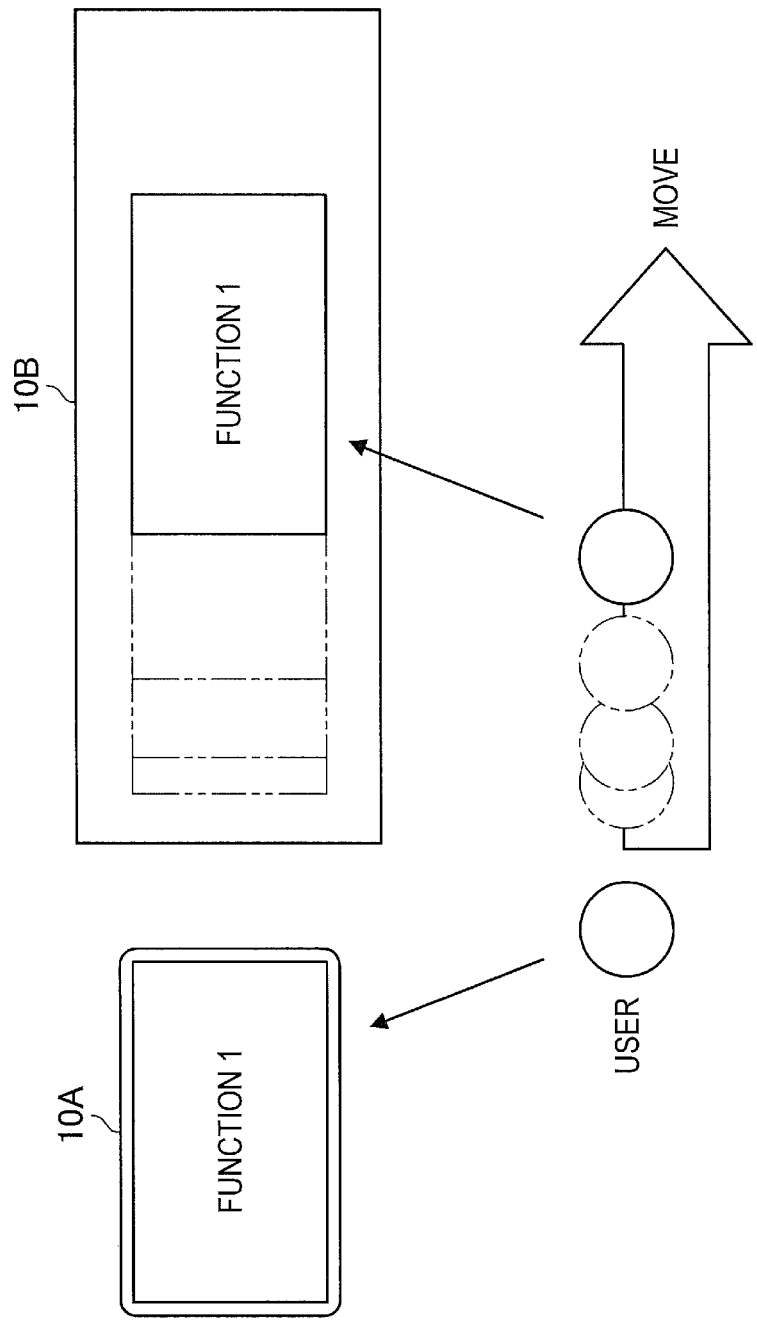
FIG. 13 is a schematic diagram for describing an example of function transmission between devices according to a second embodiment.

FIG. 13 is a schematic diagram for describing an example of function transmission between devices 10 according to the second embodiment. Here, an assumed situation is such that the user viewing content with the device 10A by the function 1 moves to another location with the device 10A left in the original location. For example, when the device 10B is arranged on a wall of a passage that is the movement destination of the user, the function being executed in the device 10A is transmitted to the device 10B. When the function is transmitted, the function 1 is no longer executed in the device 10A.

The device 10B executes the received function, thereby displaying content. The position of content displayed on the device 10B moves in accordance with the movement of the user. Thus, even during movement, the user can view the content.

The above description shows an example of transmitting the function to the device 10B arranged on the wall of the passage, but there is no limitation thereto. For example, when the user is wearing a grasses-type wearable device 10C, when the user moves, the function of the device 10A is transmitted to the wearable device 10C. In this case, the wearable device 10C displays the content on a screen.

In addition, in FIG. 13, only the function 1 is executed in the device 10A. However, there is no limitation thereto, and other functions may be executed together. In this case, the function 1 is separated and transmitted to the device 10B.

The information processing device 100 may also serve as an information provision unit that transmits information in accordance with the user's situation or schedule to the transmission destination device to which the function is transmitted. That is, the information processing device 100 transmits information in accordance with user context. Note that context information (e.g., schedule information) is stored in the storage unit 110 in advance.

For example, an example will be described in which a user who has been watching content with the device 10A at home leaves for an airport to get on a plane. In this case, during the user's movement, the information processing device 100 presents flight information or traffic information to the airport with respect to the device to which the function is transmitted. Thus, useful information in accordance with the user's situation or schedule can be provided.

3. THIRD EMBODIMENT

In the above-described first embodiment, one user causes the function 2 of the device 10A to be transmitted to the device 10B and to be validated when using the device 10A and the device 10B. In comparison, in a third embodiment, a plurality of users cause a function to be transmitted from individual devices to one device and to be validated.

Figure 14:
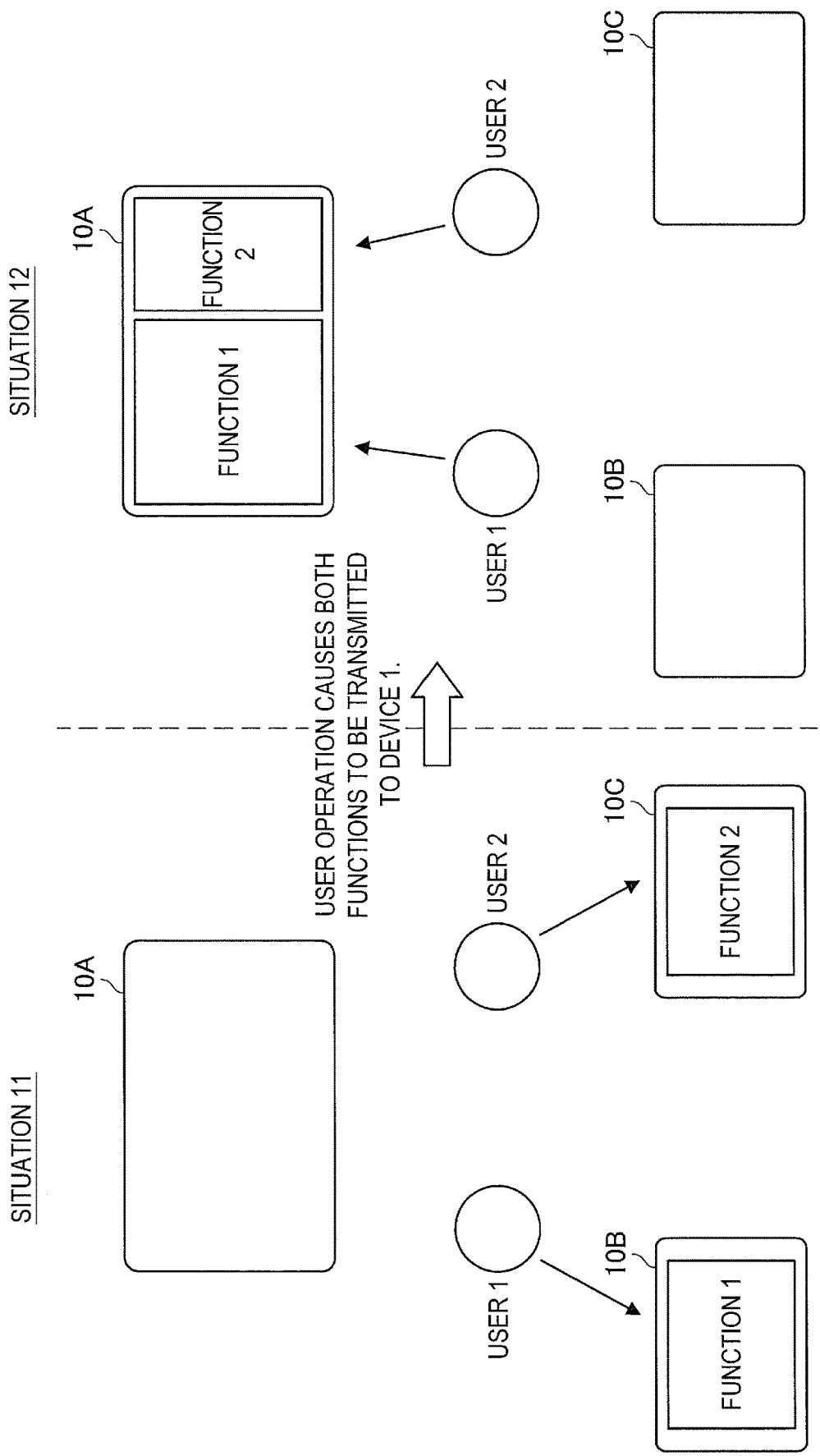
FIG. 14 is a schematic diagram for describing an example of function transmission between devices according to a third embodiment.

FIG. 14 is a schematic diagram for describing an example of function transmission between devices 10 according to the third embodiment. Here, a user 1 uses a function 1 (e.g., a display function) in the device 10B, and a user 2 uses a function 2 (e.g., an input function) in the device 10C (a situation 11). Although only one function is used in each of the devices 10B and 10C in FIG. 14 for the convenience of description, other functions may be used together.

After that, the user 1 performs an operation of transmitting the function 1 to the device 10C, and the user 2 performs an operation of transmitting the function 2 to eh device 10C. Then, the device 10C validates the function 1 and the function 2 received via the information processing device 100. Thus, on the single device 10C, the user 1 can use the function 1 and also the user 2 can use the function 2. That is, a single device can have a plurality of functions simultaneously, and thus, a plurality of uses can use one device in a shared manner.

4. FOURTH EMBODIMENT

Next, a configuration of the information processing device 100 according to a fourth embodiment will be described. Also in the fourth embodiment, the server 20 serves as the information processing device 100. In addition, the information processing device 100 according to the fourth embodiment has the same functional configuration as in the first embodiment illustrated in FIG. 2.

Also in the fourth embodiment, the function transmission unit 108 of the information processing device 100 transmits the functional information acquired from the device 10A (the transmission source device) to the device 10B (the transmission destination device) so as to cause the function 2 among the functions 1 and 2 executed in the device 10A to be executed in the device 10B. On the other hand, in the fourth embodiment, when the function transmission unit 108 transmits the functional information related to the second function to the transmission destination device, the function transmission unit 108 also transmits identification information that identifies the transmission source device that has executed the second function.

Here, the identification information is acquired by the functional information acquisition unit 104. For example, as illustrated in FIG. 5 described above, the functional information includes the device ID of the transmission source, and by use of this device ID, the transmission source device can be identified. Thus, the transmission destination device can receive the identification information and display the transmission source device on a display screen, for example.

Figure 15:
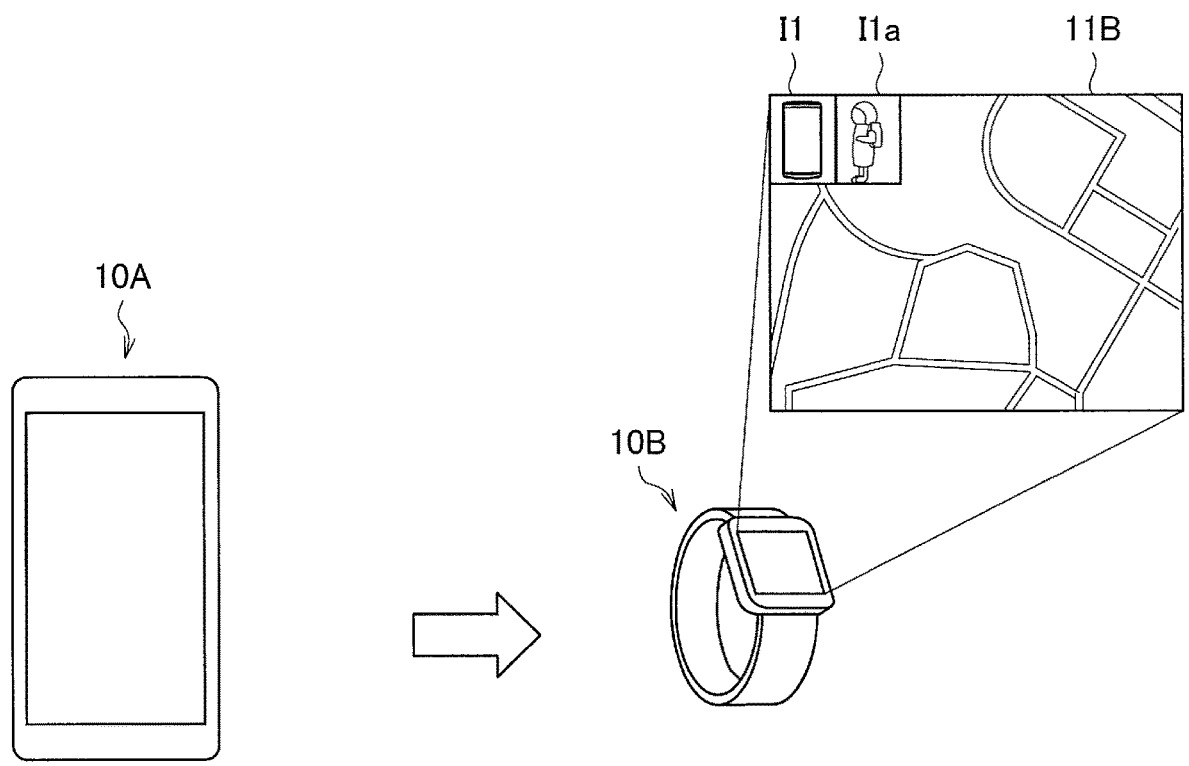
FIG. 15 is a diagram for describing a display example of a transmission source device as a function in a transmission destination device according to a fourth embodiment

FIG. 15 is a diagram for describing a display example of the transmission source device as a function in the transmission destination device according to the fourth embodiment. In the example illustrated in FIG. 15, the device 10A executes a map-displaying function and an exercise-amount-displaying function. In addition, the map-displaying function of the device 10A is transmitted to the device 10B by the function transmission unit 108 of the information processing device 100.

In this case, the device 10B receives, from the function transmission unit 108, functional information related to the map-displaying function and also identification information that identifies the device 10A that has executed the map-displaying function. Thus, when executing the map-displaying function, on the basis of the received identification information, the device 10B causes an icon I1 denoting the device 10A to be displayed on a display screen 11B, as illustrated in FIG. 15. At this time, the device 10B may also cause an icon I1a denoting an owner of the device 10A together on the display screen 11B. Thus, a user of the device 10B can easily recognize the device 10A being the transmission source of the map-displaying function and the owner of the device 10A.

Note that, in a case where the function of the device 10A is transmitted to another device 10C via the device 10B, the device 10C may display an image that identifies the device 10A and the device 10B.

Figure 16:
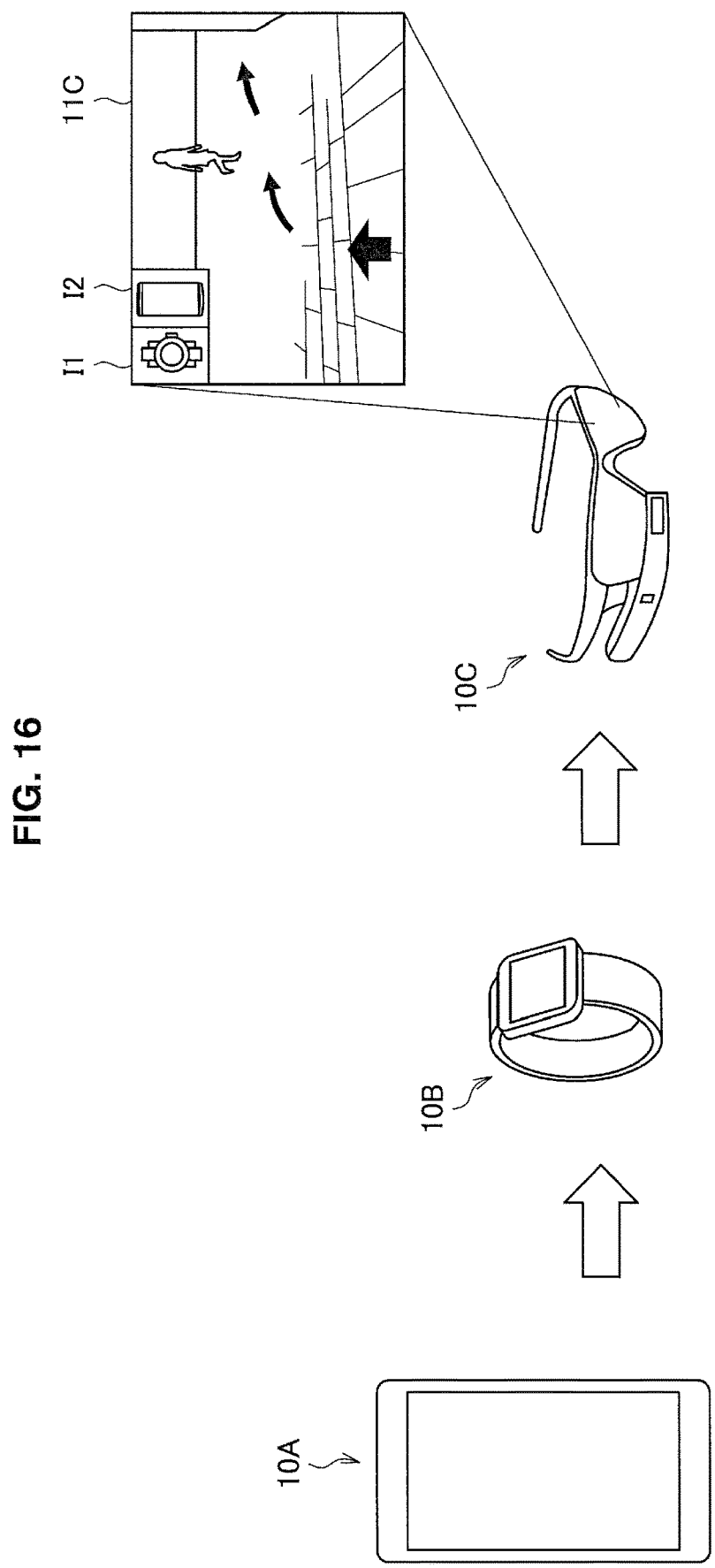
FIG. 16 is a diagram for describing a display example of a transmission source device as a function in a transmission destination device according to the fourth embodiment.

FIG. 16 is a diagram for describing a display example of the transmission source device as a function in the transmission destination device according to the fourth embodiment. Also in the example illustrated in FIG. 16, the device 10A executes the map-displaying function and the exercise-amount-displaying function. In addition, the map-displaying function of the device 10A is transmitted to the device 10C via the device 10B by the function transmission unit 108 of the information processing device 100.

In this case, the device 10C receives, from the function transmission unit 108, functional information related to the map-displaying function and also identification information that identifies the device 10A that executed the map-displaying function and the device 10B that is the via-point.

Thus, when executing the map-displaying function, on the basis of the received identification information, the device 10C causes the icon I1 and an icon 12 denoting the device 10A and the device 10B to be displayed on a display screen 11C, as illustrated in FIG. 16. Accordingly, a user of the device 10C can easily know the device 10B being the via-point in addition to the device 10A being the transmission source of the map-displaying function. Note that the device 10C may display an icon denoting owners of the devices 10A and 10B on the display screen 11C.

In the above description, the icons denoting the device 10A and the device 10B are displayed on the display screens of the transmission destination device; however, there is no limitation to this. For example, instead of the icons, character information may be displayed or audio may be outputted. Alternatively, not only the device 10A and the device 10B, an icon denoting the server 20 being the information processing device 100 that transmits the functional information may be displayed.

5. FIFTH EMBODIMENT

A configuration of the information processing device 100 according to a fifth embodiment will be described with reference to FIG. 17.

Figure 17:
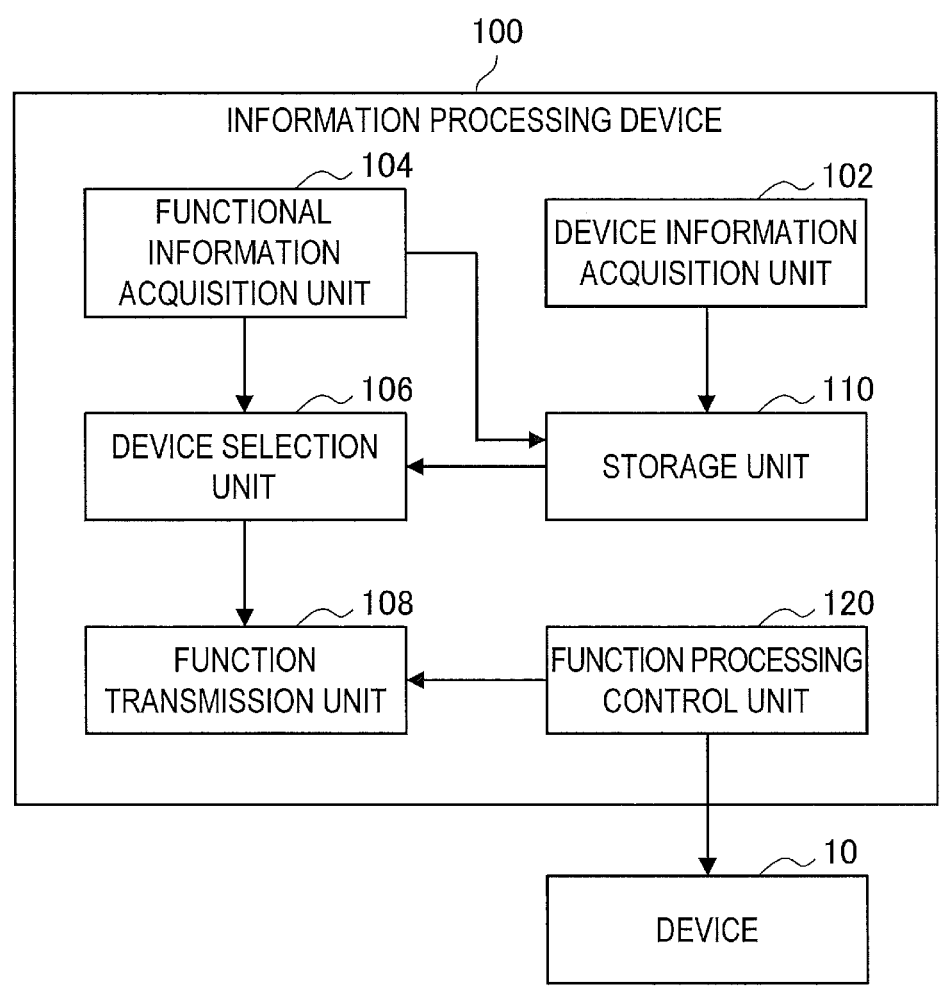
FIG. 17 is a block diagram illustrating an example of a functional configuration of an information processing device according to a fifth embodiment.

FIG. 17 is a block diagram illustrating an example of a functional configuration of the information processing device 100 according to the fifth embodiment. The information processing device 100 according to the fifth embodiment includes, in addition to the functional configuration according to the first embodiment illustrated in FIG. 2, a function processing control unit 120.

After the function 2 among the functions 1 and 2 that relate to each other is transmitted from a first device to a second device, the function processing control unit 120 controls processing of the function 1 in a first device and processing of the function 2 in the second device. In particular, when any of the functions 1 and 2 is completed, the function processing control unit 120 can execute various completion processes.

Figure 18:
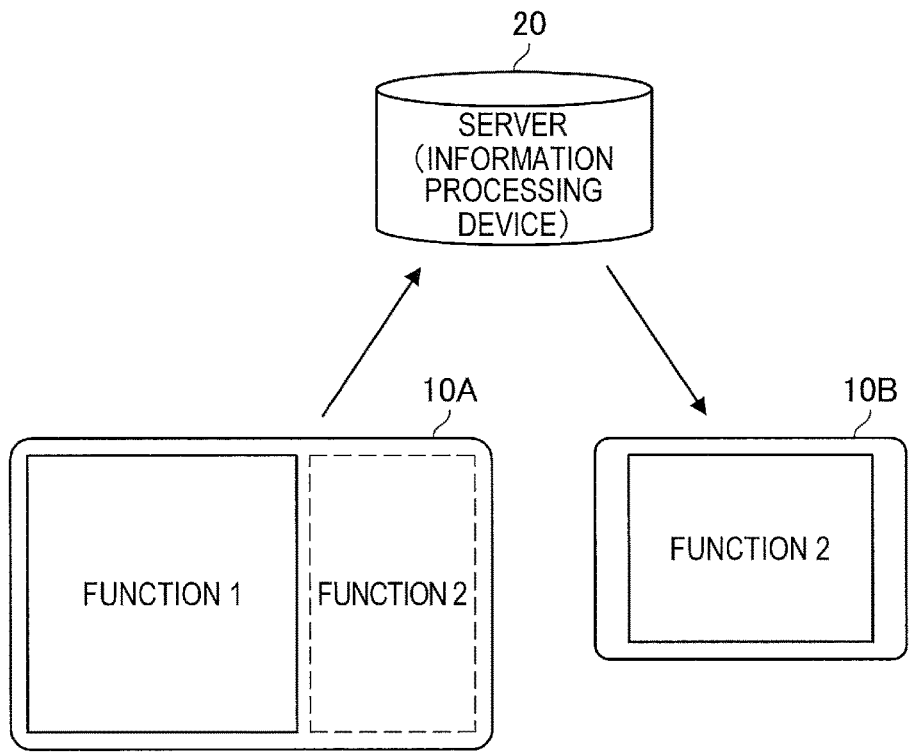
FIG. 18 is a schematic diagram for describing a flow of function transmission between devices in the fifth embodiment.

Here, as illustrated in FIG. 18, description is made by assuming that the function 2 among the functions 1 and 2 that have been executed by the device 10A (the first device) is transmitted to the device 10B (the second device). In the following description, four processing examples at the time when the function 2 is completed in the device 10B will be shown. FIG. 18 is a schematic diagram for describing a flow of function transmission between devices in the fifth embodiment.

First Processing Example

In a first processing example, when the execution of the function 2 is completed in the device 10B, the function processing control unit 120 causes the functional information related to the function 2 that has been transmitted to the device 10B to be transmitted to the device 10A via the function transmission unit 108. That is, the function processing control unit 120 acquires the functional information related to the function 2 from the device 10B and returns it to the original device 10A. Thus, the device 10A executing the function 1 can execute the function 2 again.

Second Processing Example

In a second processing example, when the execution of the function 2 is completed in the device 10B, the function processing control unit 120 refrains from displaying information related to the function 2 in a display unit of the device 10B (e.g., the display screen 11B of the device 10B illustrated in FIG. 15). Thus, the user of the device 10B can easily recognize the state in which the function 2 is not executed. Note that, in the second processing example, the functional information related to the function 2 is not returned to the device 10A and stored in the device 10B.

Third Processing Example

In a third processing example, when the execution of the function 2 is completed in the device 10B, the function processing control unit 120 causes the functional information related to the function 2 that has been transmitted to the device 10B to be transmitted to a third device that is different from the device 10A and the device 10B. That is, the function processing control unit 120 does not return the function 2 to the original device 10A and causes it to be forwarded to another device.

Figure 19:
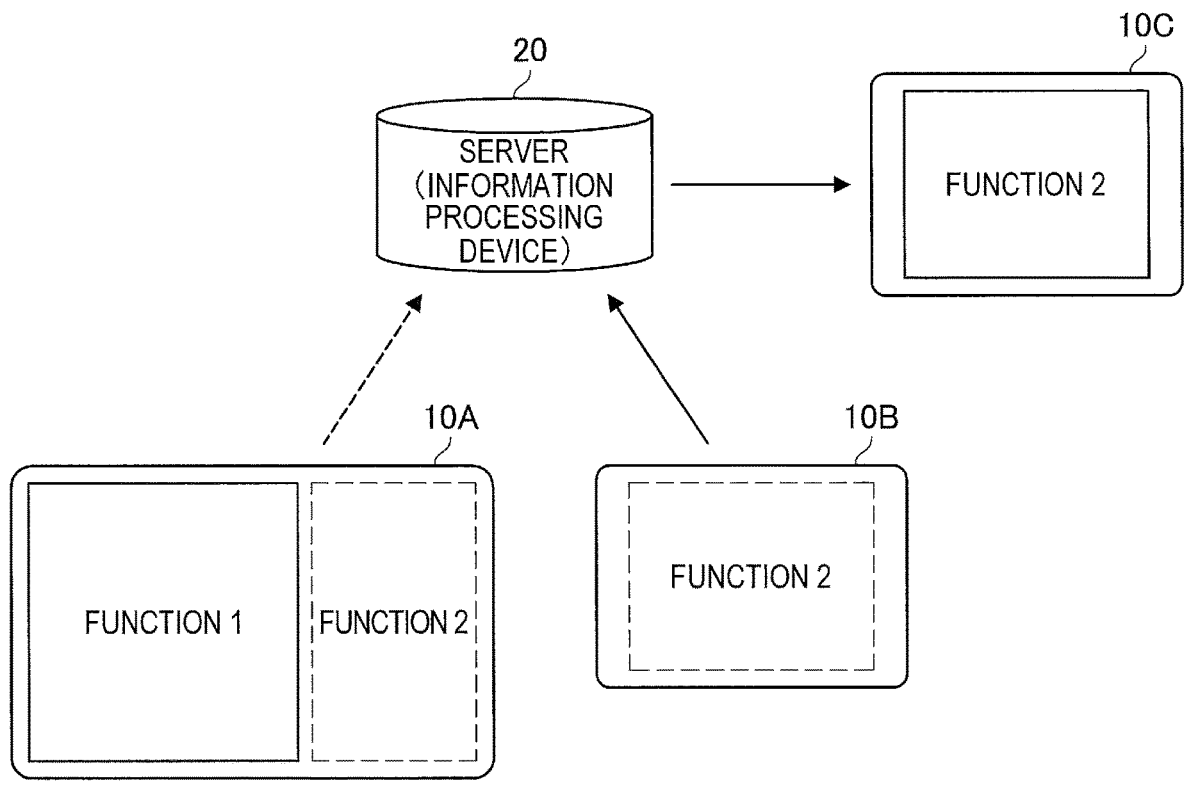
FIG. 19 is a schematic diagram for describing a flow of function transmission between devices in the fifth embodiment.

FIG. 19 is a schematic diagram for describing a flow of function transmission between devices in the fifth embodiment. In the example illustrated in FIG. 19, when the execution of the function 2 is completed in the device 10B, the functional information related to the function 2 is transmitted to the device 10C via the function transmission unit 108. Here, the device 10C is assumed to be a device more suitable for the execution of the function 2 than the device 10A. As a result, the function 2 can be executed in the device 10C, and the function 2 can be executed in a more suitable device.

Fourth Processing Example

In a fourth processing example, when the execution of the function 2 is completed in the device 10B, the function processing control unit 120 causes, not only the function 2, but also the function 1 being executed in the device 10A to be completed. That is, the function processing control unit 120 causes the relating functions 1 and 2 that are divided to different devices 10A and 10B to be completed altogether.

When one of the mutually relating functions 1 and 2, which have been originally executed in the device 10A, is completed, the other is not used in many cases. Thus, when the functions 1 and 2 are divided to a plurality of devices, when the function 2 is completed in one of the devices, by completing the function 1 of the other device, relating functions can be collectively and appropriately completed without a user operation.

The above description shows the processing examples in which the function 2 is completed in the device 10B; however, the same processing is executed when the function 1 is completed in the device 10A. For example, as the fourth processing example, when the execution of the function 1 is completed in the device 10A, the function processing control unit 120 causes, not only the function 1, but also the function 2 being executed in the device 10B, to be completed.

The user can select which of the above four processing examples to be executed. Thus, completion processing is executed as the user desires. Therefore, it is possible to provide an information processing system with a higher convenience.

6. HARDWARE CONFIGURATION

The above-described operation by the information processing device 100 is achieved by cooperation of a hardware configuration and software that are included in the information processing device 100. The hardware configuration of the information processing device 100 will be described below. Note that the device 10 has the same hardware configuration.

Figure 20:
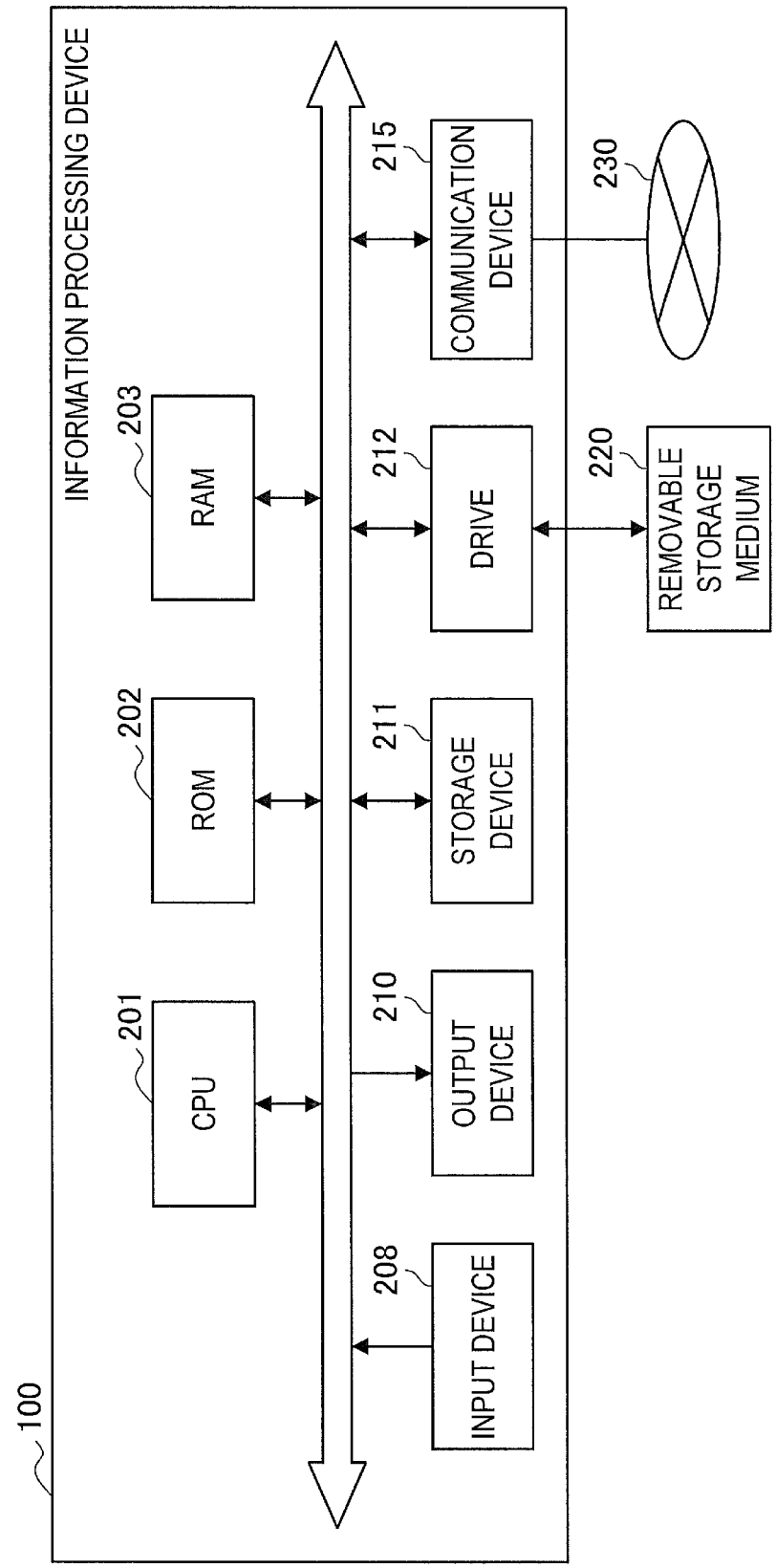
FIG. 20 is an explanatory diagram illustrating a hardware configuration of the information processing device 100.

FIG. 20 is an explanatory diagram illustrating the hardware configuration of the information processing device 100. As illustrated in FIG. 20, the information processing device 100 includes a CPU (Central Processing Unit) 201, a ROM (Read Only Memory) 202, a RAM (Random Access Memory) 203, an input device 208, an output device 210, a storage device 211, a drive 212, and a communication device 215.

The CPU 201 serves as an operation processing device and a control device, and controls all the operations within the information processing device 100 in accordance with various programs. Further, the CPU 201 may be a microprocessor. The ROM 202 stores programs and operation parameters used by the CPU 201. The RAM 203 temporarily stores programs used in the execution of the CPU 201, and parameters that arbitrarily change in this execution. These units are mutually connected by a host bus constituted from a CPU bus or the like.

The input device 208 includes an input unit, such as a mouse, a keyboard, a touch panel, buttons, a microphone, switches, or leavers, for a user to input information, and an input control circuit that generates an input signal based on an input by the user, and outputs the input signal to the CPU 201. By operating this input device 208, it is possible for the user of the information processing device 100 to input various kinds of data for the information processing device 100 and to instruct the process operations.

The output device 210 includes, for example, a display device such as a liquid crystal display (LCD) device, an OLED (Organic Light Emitting Diode) device, or a lamp. In addition, the output device 210 includes a sound output device such as a speaker or headphones. For example, the display device displays a captured image or a generated image. On the other hand, the sound output device converts sound data or the like into sounds and outputs sounds.

The storage device 211 is a device for data storage constituted as an example of a storage unit of the information processing device 100 according to the present embodiment. The storage device 211 may include a storage medium, a recording device that records data to the storage medium, a reading device that reads data from the storage medium, and an erasure device that erases data recorded in the storage medium. This storage device 211 stores programs executed by the CPU 201 and various kinds of data.

The drive 212 is a reader/writer for the storage medium, and is built into the information processing device 100 or is externally attached. The drive 212 reads information recorded on a removable storage medium 220, such as a mounted magnetic disk, an optical disc, a magneto-optical disk, or a semiconductor memory, and outputs the information to the RAM 203. Further, the drive 212 can write information to the removable storage medium 220.

The communication device 215 is, for example, a communication interface constituted by a communication device or the like for connecting to a network 230. Further, the communication device 215 may be a communication device adaptive to wireless LAN (Local Area Network) or LTE (Long Term Evolution), or a wired communication device that communicates by wires.

The network 230 is a wired or wireless transmission path for information that is transmitted from devices connected to the network 230. For example, the network 230 may include a public line network such as the Internet, a telephone line network, or a satellite communication network, or various types of LANs (Local Area Networks) including the Ethernet (registered trademark), or WAN (Wide Area Network). The network 230 may include a leased line network such as IP-VPN (Internet Protocol-Virtual Private Network).

7. CONCLUSION

The above-described information processing device 100 acquires the functional information related to the function 2 from a first device (referred to as the device 10A) executing the first function (referred to as the function 1) and the second function (referred to as the function 2) that relate to each other, as illustrated in FIG. 7. In addition, the information processing device 100 transmits the functional information acquired from the device 10A to the device 10B in order to cause the function 2 among the functions 1 and 2 that have been executed in the device 10A to be executed in the second device (referred to as the device 10B).

In a case of this configuration, the functions 1 and 2 that have been executed in the device 10A may be separated and the function 2 may be executed in the device 10B. Thus, the user becomes able to input a character (the function 2) with the device 10B at hands while viewing a Web page with the device 10A (the function 1), for example. In this manner, by executing a plurality of functions by utilizing a plurality of devices effectively, it becomes possible to operate a function of an application in a user-friendly manner.

The above description shows the server 20 serving as the information processing device 100; however, there is no limitation to this. For example, the device 10 may serve as the information processing device 100. In such a case, the device 10 selects a device being the transmission destination of the function.

The preferred embodiments of the present disclosure have been described above in detail with reference to the accompanying drawings, whilst the technical scope of the present disclosure is not limited to the above examples. A person skilled in the art may find various alterations and modifications within the technical scope of the appended claims, and it should be understood that they will naturally come under the technical scope of the present disclosure.

The steps illustrated in the flowcharts in the embodiments naturally include processes performed in the described and chronological order, and further include processes that are not necessarily performed in chronological order, but are also performed in parallel or are individually performed. Needless to say, it is also possible to change the order as necessary even in the steps for chronologically performing the processes.

The processing by the information processing device described herein may be realized by any one of software, hardware, and a combination of software and hardware. Programs included in the software are stored in advance, for example, in recording media provided inside or outside of the respective devices. Each program is read out, for example, by a random access memory (RAM) when each program is executed, and executed by a processor such as a CPU.

Additionally, the present technology may also be configured as below.

(1)

An information processing device including:

a functional information acquisition unit configured to acquire, from a first device that executes a first function and a second function that relate to each other, functional information related to the second function; and a function transmission unit configured to transmit the functional information acquired from the first device to a second device in a manner that the second function among the first function and the second function that have been executed in the first device is executed in the second device.

(2)

The information processing device according to (1), wherein the function transmission unit transmits the functional information acquired from the first device to the second device in a manner that the first function is executed in the first device and the second function is executed in the second device.

(3)

The information processing device according to (1) or (2), further including: a device selection unit configured to select the second device that transmits the functional information related to the second function from among a plurality of devices capable of communication.

(4)

The information processing device according to (3), further including:

a storage unit configured to store device information related to the plurality of devices, wherein the device selection unit selects the second device on the basis of the device information stored in the storage unit.

(5)

The information processing device according to any one of (1) to (4), wherein the function transmission unit transmits, to the first device, the functional information that has been transmitted to the second device in a manner that the second function that has been executed in the second device is executed in the first device again.

(6)

The information processing device according to (3), wherein the device selection unit selects the second device to which the functional information is transmitted in accordance with a direction in which a line of sight of a user of the first device moves.

(7)

The information processing device according to (3), wherein the device selection unit selects the second device to which the functional information is transmitted in accordance with a location of a user of the first device when the user moves.

(8)

The information processing device according to (7), further including:

an information provision unit configured to transmit information in accordance with a situation of the user to the second device to which the functional information is transmitted.

(9)

The information processing device according to any one of (1) o (8), wherein the function transmission unit transmits the functional information related to the second function, the functional information being acquired from the first device, to the second device that executes a function that has been executed in a third device.

(10)

The information processing device according to any one of (1) to (9), wherein, when the functional information related to the second function is transmitted to the second device, the function transmission unit also transmits identification information that identifies the first device that has executed the second function.

(11)

The information processing device according to any one of (1) to (10), wherein, when execution of the second function is completed in the second device, the function transmission unit transmits the functional information that has been transmitted to the second device to the first device.

(12)

The information processing device according to any one of (1) to (10), wherein the second device includes a display unit configured to display information related to the second function, and wherein the information processing device further includes a function processing control unit configured to prevent the display unit from displaying the information related to the second function when execution of the second function is completed in the second device.

(13)

The information processing device according to any one of (1) to (10), wherein, when execution of the second function is completed in the second device, the function transmission unit transmits the function information that has been transmitted to the second device to a third device.

(14)

The information processing device according to any one of (1) to (10), further including:

a function processing control unit configured to complete both the first function and the second function when execution of the first function is completed in the first device or when execution of the second function is completed in the second device.

(15)

An information processing method including:

acquiring, from a first device that executes a first function and a second function that relate to each other, functional information related to the second function; and transmitting the functional information acquired from the first device to the second device in a manner that the second function among the first function and the second function that have been executed in the first device is executed in the second device.

(16)

An information processing system including:

a first device;

a second device capable of communicating with the first device; and an information processing device including a functional information acquisition unit configured to acquire, from the first device that executes a first function and a second function that relate to each other, functional information related to the second function, and a function transmission unit configured to transmit the functional information acquired from the first device to the second device in a manner that the second function among the first function and the second function that have been executed in the first device is executed in the second device.

REFERENCE SIGNS LIST

1 information processing system
10 device 20 server
100 information processing device
102 device information acquisition unit
104 functional information acquisition unit
106 device selection unit
108 function transmission unit
110 storage unit
120 function processing control unit

The invention claimed is:

1. An information processing device, comprising:
circuitry configured to:
acquire, from a first device that executes a first function and a second function, functional information that corresponds to the second function, wherein
the first device is included in a plurality of devices, and
the first function is associated with the second function;
select a second device from the plurality of devices based on movement of a line of sight of a user from the first device to the second device, wherein the user is associated with the first device;
transmit the acquired functional information to the selected second device, wherein
the second device executes the second function based on reception of the functional information by the second device, and
the first function and the second function are executed in the first device prior to the transmission of the functional information to the second device; and
transmit the functional information to the first device, wherein
the first device re-executes, based on reception of the transmitted functional information by the first device, the second function subsequent to the execution of the second function in the second device.

2. The information processing device according to claim 1, wherein each of the plurality of devices communicates with remaining of the plurality of devices.

3. The information processing device according to claim 1, further comprising a storage unit configured to store device information of each device of the plurality of devices, wherein the circuitry is further configured to select the second device based on the stored device information.

4. The information processing device according to claim 1, wherein the circuitry is further configured to select the second device based on a current location of the user of the first device and a movement of the user.

5. The information processing device according to claim 4, wherein the circuitry is further configured to transmit specific information that corresponds to a situation of the user, to the second device.

6. The information processing device according to claim 1, wherein the circuitry is further configured to transmit the acquired functional information to the second device that executes a third function that has been executed in a third device of the plurality of devices.

7. The information processing device according to claim 1, wherein the circuitry is further configured to transmit identification information to the second device based on the transmission of the functional information to the second device, and
the identification information identifies the first device that has executed the second function.

8. The information processing device according to claim 1, wherein the circuitry is further configured to transmit, based on completion of the execution of the second function in the second device, the functional information to the first device.

9. The information processing device according to claim 1, wherein the second device includes a display unit that displays the functional information, and
the circuitry is further configured to prevent the display of the functional information on the display unit based on completion of the execution of the second function in the second device.

10. The information processing device according to claim 1, wherein the circuitry is further configured to transmit, based on completion of the execution of the second function in the second device, the functional information to a third device of the plurality of devices.

11. The information processing device according to claim 1, wherein the circuitry is further configured to complete both the first function and the second function, based on one of completion of the execution of the first function in the first device or completion of the execution of the second function in the second device.

12. An information processing method, comprising:
acquiring, from a first device that executes a first function and a second function, functional information that corresponds to the second function, wherein the first device is included in a plurality of devices, and
the first function is associated with the second function;
selecting a second device from the plurality of devices based on a direction of
movement of a line of sight of a user from the first device to the second device, wherein the user is associated with the first device;
transmitting the acquired functional information to the selected second device,
wherein the second device executes the second function based on reception of the functional information by the second device, and
the first function and the second function are executed in the first device prior to the transmission of the functional information to the second device; and
transmitting the functional information to the first device, wherein
the first device re-executes, based on reception of the transmitted functional information by the first device, the second function subsequent to the execution of the second function in the second device.

13. An information processing system, comprising:
a first device configured to execute a first function and a second function, wherein the first function is associated with the second function;
a second device configured to communicate with the first device; and an information processing device that includes: circuitry configured to:
acquire, from the first device, functional information that corresponds to the second function;
select the second device based on a movement of a line of sight of a user from the first device to the second device;
wherein the user is associated with the first device;
transmit the acquired functional information to the selected second device, wherein
the second device is further configured to execute the second function based on reception of the functional information by the second device, and the first function and the second function are executed in the first device prior to the transmission of the functional information to the second device; and transmit the functional information to the first device, wherein the first device re-executes, based on reception of the transmitted functional information by the first device, the second function subsequent to the execution of the second function in the second device.

14. The information processing system according to claim 13, wherein the first device is further configured to delete information related to the second function based on the transmission of the functional information that corresponds to the second function.

15. The information processing system according to claim 13, wherein the second device is further configured to display, on a display unit, an icon related to the first device, and the icon is displayed on the display unit based on the reception of the functional information by the second device.

* * * * *